US 7,817,224 B2

United States Patent
Sudo

(10) Patent No.: US 7,817,224 B2
(45) Date of Patent: Oct. 19, 2010

(54) LIQUID CRYSTAL MODULE HAVING A PLURALITY OF REINFORCING RIBS ON BOTH SIDES OF A LIGHT SOURCE SUPPORT

(75) Inventor: Tatsuji Sudo, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 104 days.

(21) Appl. No.: 12/121,889

(22) Filed: May 16, 2008

(65) Prior Publication Data

US 2008/0291355 A1 Nov. 27, 2008

(30) Foreign Application Priority Data

May 22, 2007 (JP) .............................. 2007-135004

(51) Int. Cl.
*G02F 1/1335* (2006.01)
*G09F 13/04* (2006.01)
*F21V 21/00* (2006.01)

(52) U.S. Cl. ..................... 349/70; 362/97.2; 362/271.16
(58) Field of Classification Search .................. 349/58, 349/61, 63, 70, 71; 362/97.1–97.4, 612, 362/634
See application file for complete search history.

(56) References Cited

U.S. PATENT DOCUMENTS

| 2004/0012763 | A1* | 1/2004 | Yu et al. .................... 353/122 |
| 2004/0257792 | A1 | 12/2004 | Yu et al. |
| 2006/0192915 | A1* | 8/2006 | Kimura ........................ 349/151 |
| 2006/0291190 | A1* | 12/2006 | Tsai .............................. 362/97 |
| 2007/0013825 | A1* | 1/2007 | Kim et al. ...................... 349/58 |
| 2007/0070652 | A1* | 3/2007 | Takata et al. ................. 362/655 |
| 2007/0091589 | A1 | 4/2007 | Choi et al. |
| 2010/0142186 | A1* | 6/2010 | Aoki ........................ 362/97.2 |

FOREIGN PATENT DOCUMENTS

| JP | 2004-348150 A | 12/2004 |
| JP | 2005-085689 A | 3/2005 |
| JP | 2006-261135 A | 9/2006 |
| WO | WO-2006/059463 A1 | 6/2006 |
| WO | WO-2007/029411 A1 | 3/2007 |

OTHER PUBLICATIONS

European Search Report of Corresponding European Application No. 08 00 9407.1 dated May 19, 2010.

\* cited by examiner

*Primary Examiner*—Mark A Robinson
*Assistant Examiner*—Paul C Lee
(74) *Attorney, Agent, or Firm*—Global IP Couselors, LLP

(57) ABSTRACT

A liquid crystal module includes a liquid crystal panel, a backlight unit, a light reflecting plate and a light source holder. The backlight unit is disposed on a rear side of the liquid crystal panel. The backlight unit has a light source that is configured to emit light. The light reflecting plate is disposed on a rear side of the back light unit and configured to reflect the light. The light source holder has a band-shaped base attached to the light reflecting plate, a plurality of light source supports disposed on the band-shaped base at spaced apart locations and having an open ring portion that is open to a front side, and a plurality of reinforcing ribs formed on both side of each of the light source supports.

14 Claims, 4 Drawing Sheets

LIQUID CRYSTAL MODULE HAVING A PLURALITY OF REINFORCING RIBS ON BOTH SIDES OF A LIGHT SOURCE SUPPORT

CROSS-REFERENCE TO RELATED APPLICATIONS

This application claims priority to Japanese Patent Application No. 2007-135004 filed on May 22, 2007. The entire disclosure of Japanese Patent Application No. 2007-135004 is hereby incorporated herein by reference.

BACKGROUND OF THE INVENTION

1. Field of the Invention

The present invention generally relates to a liquid crystal module. More specifically, the present invention relates to a liquid crystal module having a light source holder.

2. Background Information

A conventional liquid crystal modules incorporated in television sets includes a liquid crystal panel, a backlight unit, a light reflecting plate, a plurality of cold cathode fluorescent lamp holders, a frame and a bezel. The backlight unit is provided at a rear side of the liquid crystal panel. The backlight unit has a light source including cold cathode fluorescent lamps (CCFL). The backlight unit and the liquid crystal panel are held inside the frame. Four sides of the liquid crystal panel are fixed with the bezel. Each of the cold cathode fluorescent lamp holders has a cold cathode fluorescent lamp supports. The cold cathode fluorescent lamp holders are attached to the light reflecting plate. The cold cathode fluorescent lamps are supported by being fitted into the open ring-shaped cold cathode fluorescent lamp supports.

With a conventional backlight device, a plurality of lamp holders is made of a transparent synthetic resin (see Japanese Laid-Open Patent Application Publication No. 2004-348150, for example). The lamp holders are fixed to a reflecting plate by inserting bushing-shaped components of the lamp holders into mounting holes in the reflecting plate. Fluorescent lamps are fitted into notched circular fluorescent lamp gripping components of the lamp holders.

With a conventional light source support device, a mounting body is provided with a plurality of substantially V-shaped mounting parts for mounting fluorescent lamps (see Japanese Laid-Open Patent Application Publication No. 2006-261135, for example). A restriction body is provided with a plurality of restriction parts provided corresponding to the mounting parts for restricting movement of the fluorescent lamps by holding the fluorescent lamps down. The mounting body and the restriction body are superposed one over the other and integrally latched by a latching means.

However, with the conventional liquid crystal module, the cold cathode fluorescent lamp holder attached to the light reflecting plate of the backlight unit is injection molded from a synthetic resin, and the open ring-shaped cold cathode fluorescent lamp supports is quite thin in wall thickness. Thus, during an impact test, the cold cathode fluorescent lamps falls out of the cold cathode fluorescent lamp holders, and the cold cathode fluorescent lamp supports are susceptible to deformation. Another problem was that during transport of the cold cathode fluorescent lamp holders, the cold cathode fluorescent lamp supports are susceptible to deformation by vibration or impact.

Meanwhile, the lamp holders incorporated into the above-mentioned conventional backlight device are also molded from a transparent synthetic resin. The notched circular fluorescent lamp gripping components are thin-walled. Thus, the problem is the same as above, in that the fluorescent lamps fall out or the fluorescent lamp gripping components are susceptible to deformation. Also, with the above-mentioned light source support device, the mounting body is also molded from a synthetic resin, and the mounting parts for mounting the fluorescent lamps are thin-walled. Thus, the same problems as above are encountered.

In view of the above, it will be apparent to those skilled in the art from this disclosure that there exists a need for an improved liquid crystal module. This invention addresses this need in the art as well as other needs, which will become apparent to those skilled in the art from this disclosure.

SUMMARY OF THE INVENTION

The present invention was conceived in light of the above-mentioned problems. One object of the present invention is to provide a liquid crystal module with which a light source is prevented from falling out.

In accordance with one aspect of the present invention, a liquid crystal module includes a liquid crystal panel, a backlight unit, a light reflecting plate and a light source holder. The backlight unit is disposed on a rear side of the liquid crystal panel. The backlight unit has a light source that is configured to emit light. The light reflecting plate is disposed on a rear side of the back light unit and configured to reflect the light. The light source holder has a band-shaped base attached to the light reflecting plate, a plurality of light source supports disposed on the band-shaped base at spaced apart locations and having an open ring portion that is open to a front side, and a plurality of reinforcing ribs formed on both side of each of the light source supports.

With the liquid crystal module of the present invention, it is possible to provide a liquid crystal module with which a light source is prevented from falling out.

These and other objects, features, aspects and advantages of the present invention will become apparent to those skilled in the art from the following detailed descriptions, which, taken in conjunction with the annexed drawings, discloses selected embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
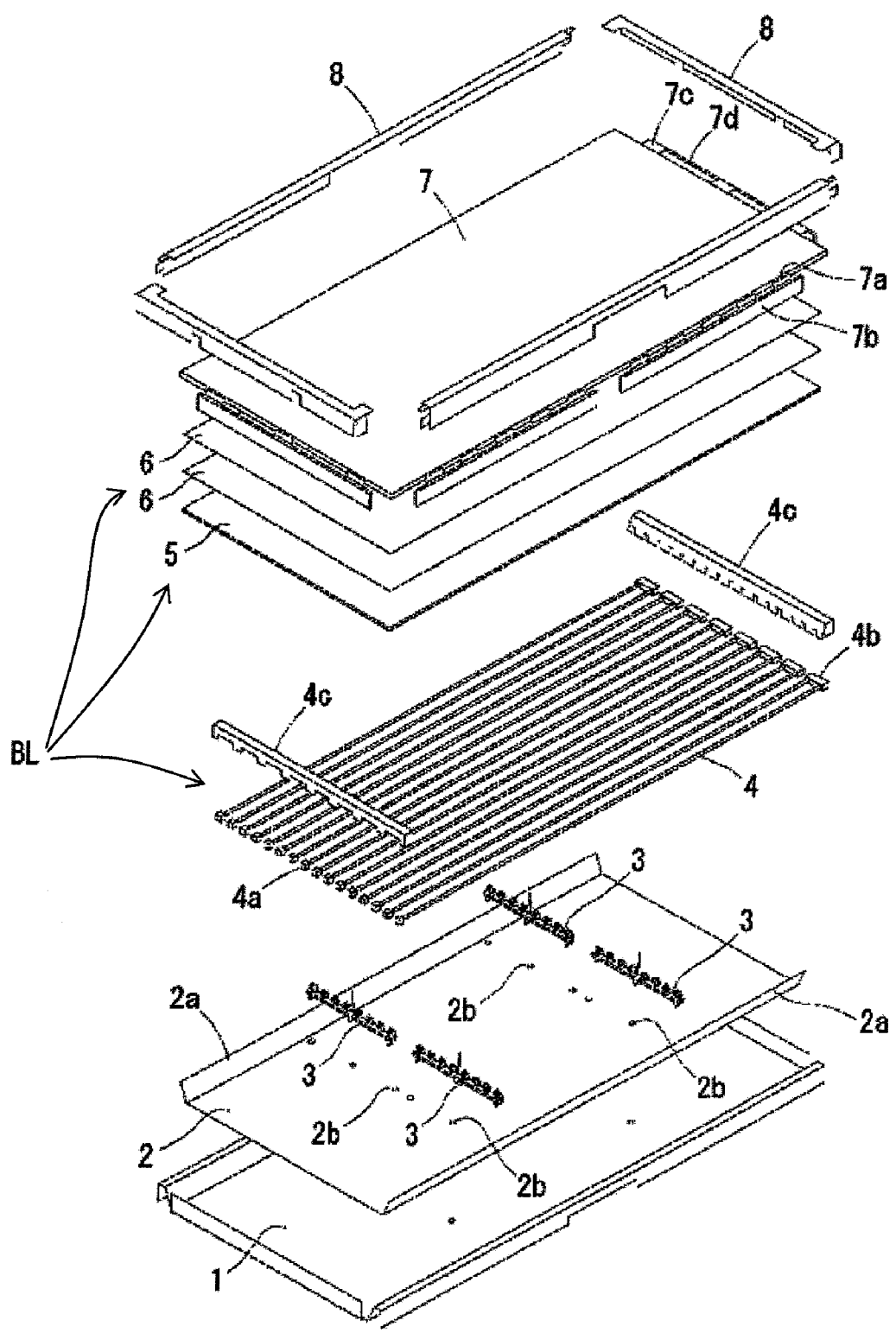
FIG. 1 is an exploded perspective view of a liquid crystal module in accordance with a first embodiment of the present invention.

Selected embodiments of the present invention will now be explained with reference to the drawings. It will be apparent to those skilled in the art from this disclosure that the following descriptions of the selected embodiments of the present invention is provided for illustration only and not for the purpose of limiting the invention as defined by the appended claims and their equivalents.

An overall configuration of a liquid crystal module in accordance with a first embodiment of the present invention will be described through reference to FIGS. 1 to 4. The liquid crystal module is incorporated in a television set or a display device, such as a liquid crystal display. The liquid crystal module includes a liquid crystal panel 7, a backlight unit BL, a light reflecting plate 2 and a plurality of light source holders 3. The backlight unit BL is disposed on a rear side (underneath) of the liquid crystal panel 7. The backlight unit BL has a plurality of cold cathode fluorescent lamps 4 as a light source, a light diffusing plate 5, a plurality of prism sheets 6, etc. The cold cathode fluorescent lamps 4 emit light. The light reflecting plate 2 is disposed on a rear side of the back light unit BL. The light reflecting plate 2 has rectangular shape and reflects the light emitted by the cold cathode fluorescent lamps 4. The liquid crystal panel 7 and the backlight unit BL are housed inside a rectangular frame 1 made of metal or a synthetic resin. Four edges of the liquid crystal panel 7 are fixed with a bezel 8.

The light reflecting plate 2 is provided over a bottom part of the frame 1. To improve reflection efficiency, mutually opposing long side portions 2a of the light reflecting plate 2 are bent upward and outward at an angle so as to cover an inner face of side walls of the frame 1.

The light source holder 3 are attached at four locations, such as two on the right and two on the left, to an upper face (light reflecting face) of the light reflecting plate 2. A plurality of (16 in FIG. 1) the cold cathode fluorescent lamps 4 are disposed in parallel in a lateral direction of the liquid crystal module and above the light reflecting plate 2. The cold cathode fluorescent lamps 4 are fitted into open ring-shaped light source supports 3b of the light source holders 3, and are supported at two locations on the left and right.

The light source holders 3 will be described in detail below.

The cold cathode fluorescent lamps 4 have pin terminals at both ends of the cold cathode fluorescent lamps 4. Connected portions between lead wires and the pin terminals are covered by electrically insulated rubber sockets 4a and 4b. The connected portions are held down and fixed in place from above by retainer bars 4c that have an inverted U-shaped cross section. With the liquid crystal module, the retainer bars 4c are made of a white resin with excellent light reflecting properties in order to improve light reflecting efficiency.

The light diffusing plate 5 and two prism sheets 6 of the backlight unit BL are stacked over the cold cathode fluorescent lamps 4. The light directly incident from the cold cathode fluorescent lamps 4 and the light reflected by the light reflecting plate 2 is uniformly diffused when transmitted through the light diffusing plate 5. Furthermore, directionality of the light is increased when it is transmitted through the prism sheets 6. Therefore, the liquid crystal panel 7 is illuminated at uniform brightness from the rear (underneath). Thus, the luminance and evenness of the liquid crystal display are improved.

The rectangular liquid crystal panel 7 is provided via a spacer (not shown) in front of (over) the prism sheets 6 of the backlight unit BL. The four edges of the liquid crystal panel 7 are held down and fixed in place by the bezel 8. A band-shaped printing wiring board 7b is connected to a long side of the liquid crystal panel 7 via a COF (Cip On Film) 7a on which a source driver IC chip is mounted. A band-shaped printing wiring board 7d is connected to a short side via a COF 7c on which a gate driver IC chip is mounted. The printing wiring boards 7b and 7d are attached to side faces of the frame 1 while the COFs 7a and 7c are bent downward (rearward) at 90°.

Figure 2:
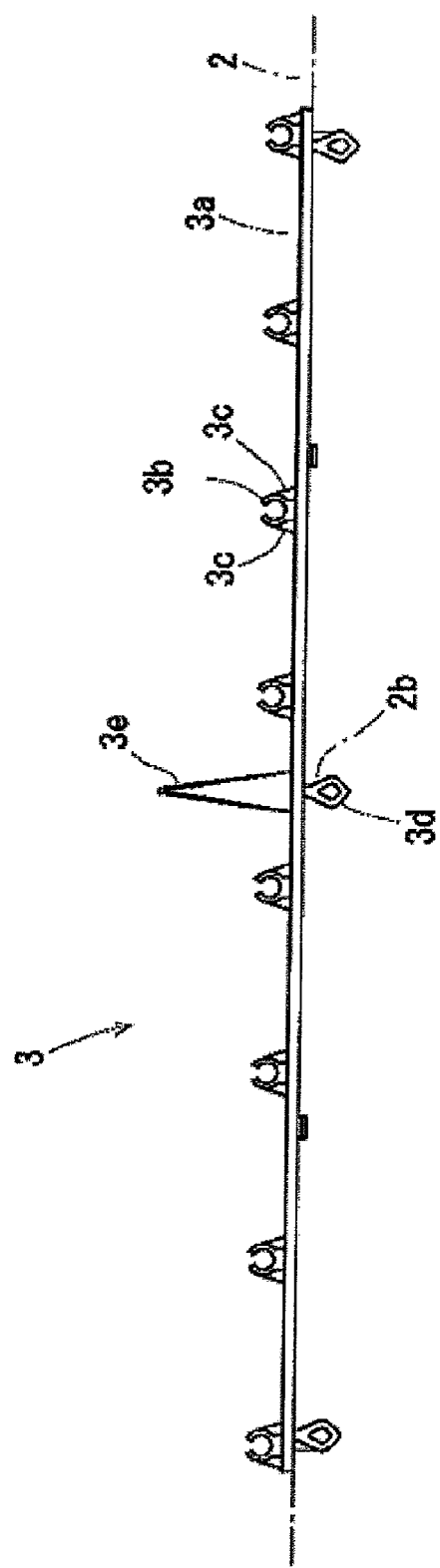
FIG. 2 is a side elevational view of a light source holder of the liquid crystal module illustrated in FIG. 1.

The light source holders 3 are injection molded from a white resin (thermoplastic resin containing a white pigment). The white resin preferably has excellent light reflecting properties. As shown in FIG. 2, each of the light source holders 3 includes a band-shaped base 3a, a plurality of (8 in FIG. 2) light source supports 3b, a plurality of reinforcing ribs 3c, a plurality of hollow protrusions 3d and a supporting protrusion 3e. Each of the band-shaped base 3a is attached to the light reflecting plate 2. Each of the light source supports 3b is open at a top to a front side. The light source supports 3b are disposed on an upper face of the band-shaped base 3a at locations apart from each other. The reinforcing ribs 3c are formed on both sides of each of the light source supports 3b.

The hollow protrusions 3d are formed on a lower face at both longitudinal ends and in the middle of the band-shaped base 3a. The hollow protrusions 3d are inserted in attachment holes 2b formed in the light reflecting plate 2 to attach the light source holders 3 to the light reflecting plate 2. Also, the supporting protrusion 3e supports the light diffusing plate 5, the prism sheets 6, and the liquid crystal panel 7 so that the light diffusing plate 5, the prism sheets 6, and the liquid crystal panel 7 do not bend toward the cold cathode fluorescent lamps 4. The supporting protrusion 3e is formed on the upper face in the middle of the band-shaped base 3a.

Figure 3:
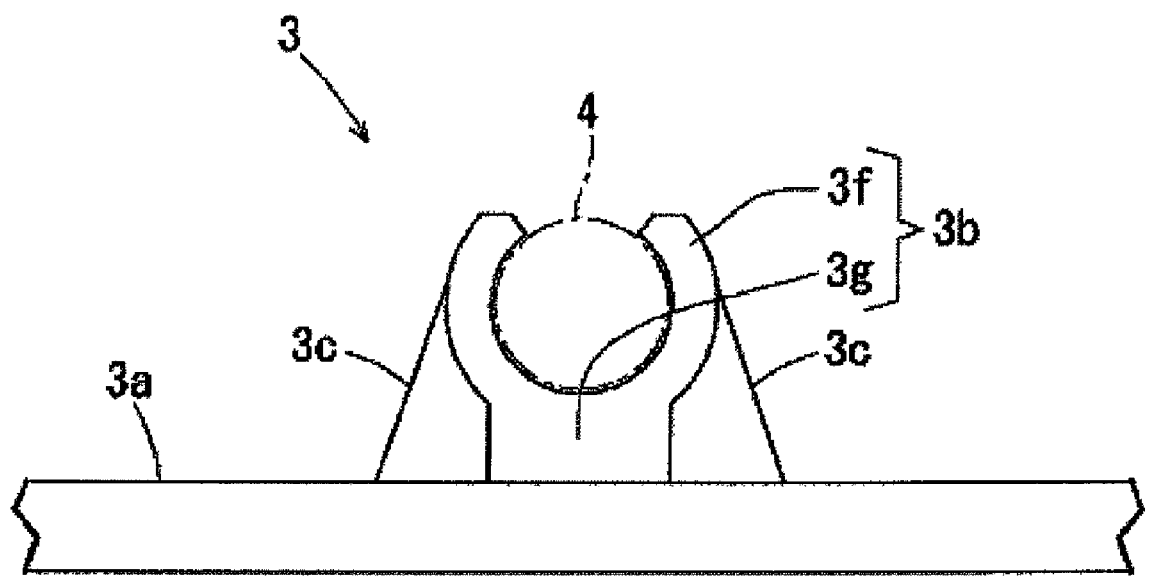
FIG. 3 is a partial side elevational view of the light source holder.
Figure 4:
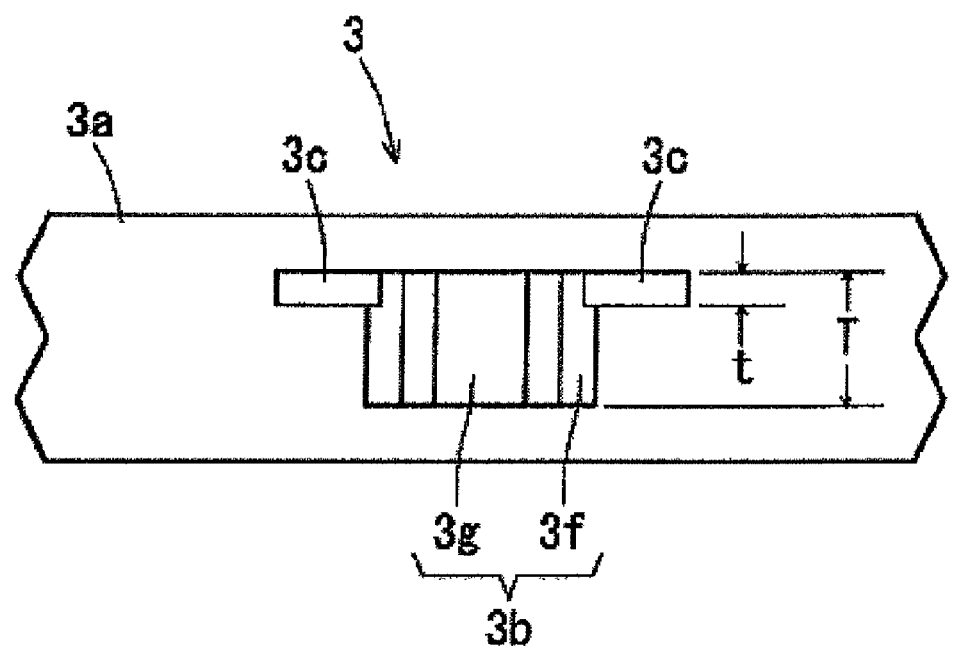
FIG. 4 is a partial front elevational view of the light source holder.

As shown in FIGS. 3 and 4, each of the light source supports 3b has an open ring (e.g., open ring portion) 3f and a support component (e.g., leg portion) 3g. Each of the open rings 3f is cut open at the top over a length of about one quarter of arc. Each of the support components 3g supports each of the open rings 3f. Specifically, the support component 3g extends from the open ring 3f to the band-shaped base 3a. Two transitions are formed on each of the light source supports 3b at locations between side faces of the support component 3g and an outer peripheral face of the open ring 3f. The cold cathode fluorescent lamps 4 are pushed into the open rings 3f from above and thus supported. The reinforcing ribs 3c are integrally molded on both sides of each of the light source supports 3b. Each of the reinforcing ribs 3c has a shape that is wider at a bottom and has a sloped side face. In other words, each of the reinforcing ribs 3c has a sloped portion with larger width towards the band-shaped base 3a. As shown in FIG. 3, each of the reinforcing ribs 3c is formed from locations slightly higher than a center of each of the open rings 3f located on both sides of the outer peripheral face of each of the open rings 3f to the upper face of the band-shaped base 3a. Furthermore, the reinforcing ribs 3c are formed at locations including the transitions formed between the support component 3g and the open ring 3f, respectively. As shown in FIG. 4, thickness t of the reinforcing ribs 3c in a longitudinal direction is set to be no more than one-third of thickness T of the light source supports 3b in a longitudinal direction.

The light source supports 3b are reinforced from both sides by the reinforcing ribs 3c. Thus, even if the light source supports 3b are subjected to impact or vibration during impact testing of the liquid crystal module or transport of the light source holder 3, there will be almost no worry that the open rings 3f of the light source supports 3b will spread out or be deformed, or that the cold cathode fluorescent lamps 4 supported by the open rings 3f will fall out. Also, when the light source holders 3 are removed from mold after injection molding, the light source holders 3 can be easily removed without deforming the light source supports 3b, by pushing on the reinforcing ribs 3c on both sides with pins.

If the thickness t of the reinforcing ribs 3c is the same as the thickness T of the light source supports 3b, then the portion where light reflection is decreased by the reinforcing ribs 3c will be in shadow, and there is the possibility that this will be partially displayed on the display face of the liquid crystal panel 7. However, with the liquid crystal module, the thickness t of the reinforcing ribs 3c is set to be no more than one-third of the thickness T of the light source supports 3b as discussed above. Thus, the reinforcing ribs 3c will cause less decrease in light reflection. Accordingly, the partial shadowing of the display face of the liquid crystal panel 7 can be suppressed.

To suppress shadowing, it is good for the thickness t of the reinforcing ribs 3c to be as low as possible. However, if the reinforcing ribs 3c are too thin, then the reinforcing function will be diminished, and they will not have sufficient effect of preventing the cold cathode fluorescent lamps 4 from falling out or preventing the deformation of the light source supports 3b. Furthermore, there will be the risk that the pins will go through the reinforcing ribs 3c during mold removal. Therefore, the thickness t of the reinforcing ribs 3c is preferably set to be from one-third to one-fourth of the thickness T of the light source supports 3b. The slope angle of the sloped side faces of the reinforcing ribs 3c (the slope angle with respect to the upper face of the band-shaped base 3a) is preferably set to about 45° to 70°.

The reinforcing ribs 3c can be formed on both sides of the middle part of the light source supports 3b in the longitudinal direction. However, the reinforcing ribs 3c are preferably formed on both sides of a right longitudinal end of each of the light source supports 3b as shown in FIG. 4, or on both sides of a left longitudinal ends, because the molding mold will be easier to produce and modify.

The shape of the reinforcing ribs is not limited to the above-mentioned shape. Various shapes can be employed as shown in FIGS. 5 to 6.

Figure 5:
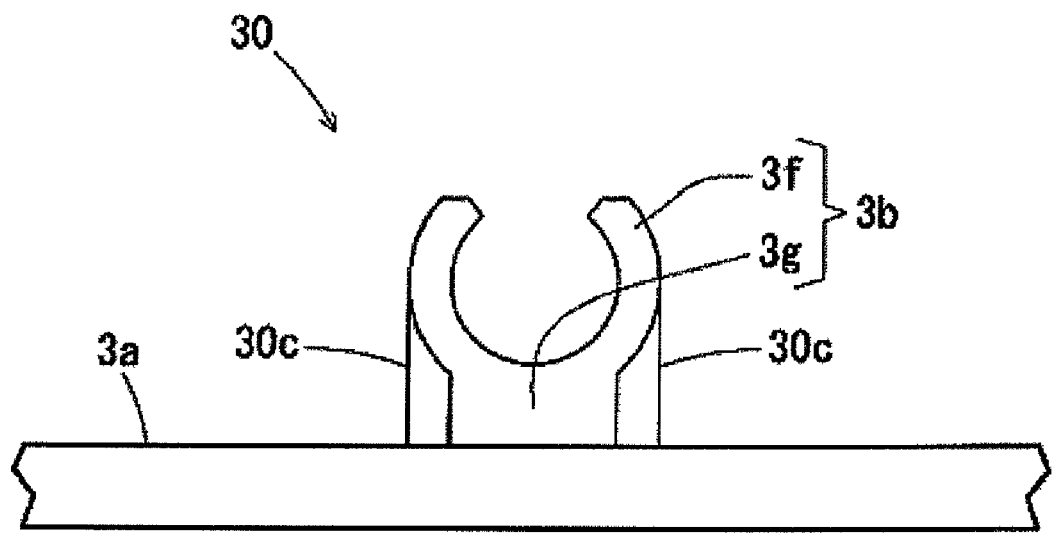
FIG. 5 is a partial side elevational view of a light source holder in accordance with a second embodiment of the present invention.
Figure 6:
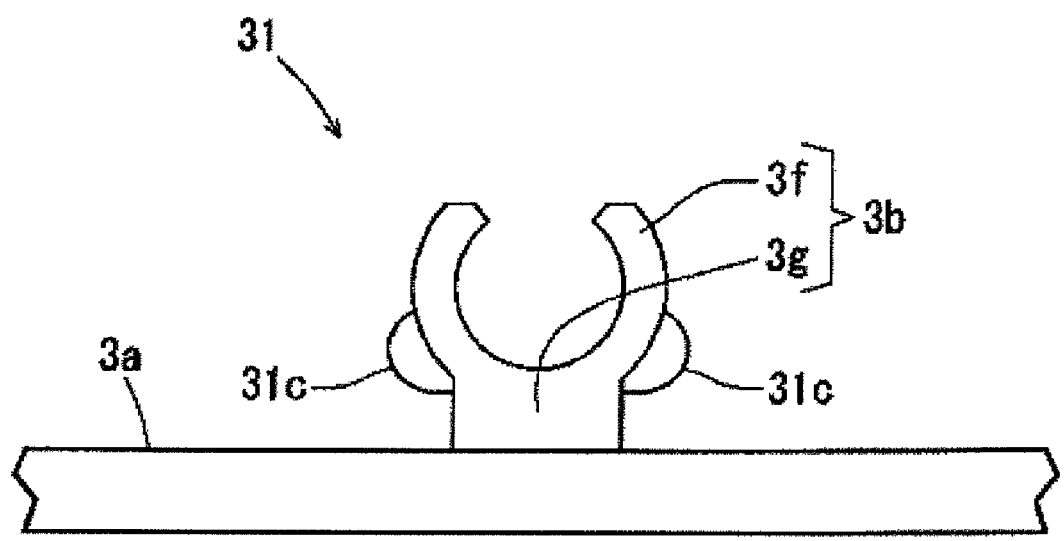
FIG. 6 is a partial side elevational view of a light source holder in accordance with a third embodiment of the present invention.

FIG. 5 is a partial side elevational view of a light source holder 30 in accordance with a second embodiment of the present invention. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

With the light source holder 30, each of reinforcing ribs 30c has an upright shape with a vertical side face. In other words, each of the reinforcing ribs 30c has a vertical side portion having an upright shape and are formed on both sides of each of the light source supports 3b having the open ring 3f and the support component 3g. Each of the reinforcing ribs 30c is integrally molded with the light source holder 30 from locations having substantially same height as the center of the open ring 3f located on both sides of the outer peripheral face of each of the open ring 3f to the upper face of the band-shaped base 3a. Furthermore, the reinforcing ribs 30c are formed at locations including the transitions formed between the support component 3g and the open ring 3f, respectively. Just as with the above-mentioned reinforcing ribs 3c, the thickness of the reinforcing ribs 30c is set to be no more than one-third the thickness of the light source supports 3b.

Compared to the reinforcing ribs 3c, the light source holder 30 having the reinforcing ribs 30c with the upright shape suffers less decrease in light reflection by the reinforcing ribs 30c because the reinforcing ribs 30c do not jut outside the open rings 3f. As a result, the partial shadowing of the display face of the liquid crystal panel 7 is further suppressed.

FIG. 6 is a partial side elevational view of a light source holder in accordance with a third embodiment of the present invention. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

With the light source holder 31, each of reinforcing ribs 31c has a substantially semicircular shape with a circular-arced side face. In other words, each of the reinforcing ribs 31c has a circular-arced side portion having a substantially semicircular shape, and are formed on both sides of each of the light source supports 3b having the open ring 3f and the support component 3g. Each of the reinforcing ribs 30c is integrally molded with the light source holder 31 at locations lower than a center of the open ring 3f located on both sides of an outer peripheral face of the open ring. Furthermore, the reinforcing ribs 30c are formed at locations including the transitions formed between the support component 3g and the open ring 3f, respectively. Just as with the reinforcing ribs 30c, the thickness of the reinforcing ribs 31c is set to be no more than one-third the thickness of the light source supports 3b.

With the light source holder 31, the reinforcing ribs 31c are small. However, the locations on both sides of the open rings 3f and lower than the center of the open rings 3f, which are subjected to the greatest external force when the open rings 3f are deformed, are reinforced by the reinforcing ribs 31c. Thus, the open rings 3f are prevented from being deformed and the cold cathode fluorescent lamps 4 are prevented from falling out. Furthermore, since there is almost no decrease in light reflection caused by the reinforcing ribs 31c, the partial shadowing of the display face of the liquid crystal panel 7 can be further suppressed.

In some cases, the reinforcing ribs 31c with a substantially semicircular shape can be combined with the reinforcing ribs 3c or 30c having a shape that is wider at the bottom or an upright shape, and the thickness of the reinforcing ribs 31c can be the same as the thickness of the light source supports 3b, and the thickness of the reinforcing ribs 3c or 30c can be set to be no more than one-third of the thickness of the light source supports 3b. With this structure, the transitions, which are subjected to the greatest external force when the open rings 3f are deformed, are securely reinforced.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a liquid crystal module equipped with the present invention. Accordingly, these terms, as utilized to describe the present invention should be interpreted relative to a liquid crystal module equipped with the present invention as used in the normal operating position.

While selected embodiments have been chosen to illustrate the present invention, it will be apparent to those skilled in the art from these disclosures that various changes and modifications can be made herein without departing from the scope of the invention as defined in the appended claims. Furthermore, the foregoing descriptions of the selected embodiments according to the present invention are provided for illustration only, and not for the purpose of limiting the invention as defined by the appended claims and their equivalents.

What is claimed is:

1. A liquid crystal module comprising:
   a liquid crystal panel;
   a backlight unit disposed on a rear side of the liquid crystal panel and having a light source that is configured to emit light;
   a light reflecting plate disposed on a rear side of the back light unit and configured to reflect the light; and
   a light source holder having a band-shaped base attached to the light reflecting plate, a plurality of light source supports disposed on the band-shaped base at spaced apart locations and having an open ring portion that is open to a front side, and a plurality of reinforcing ribs formed on both side of each of the light source supports,
   thickness of the reinforcing ribs being less than thickness of the light source supports as measured in a direction parallel to a central axis of the light source, and end faces of the reinforcing ribs being aligned with end faces of the light source supports in the direction parallel to the central axis of the light source.

2. A liquid crystal module according to claim 1, wherein the light source includes a cold cathode fluorescent lamp.

3. A liquid crystal module according to claim 2, wherein the light source holder is made of a synthetic resin.

4. The liquid crystal module according to claim 1, wherein the thickness of the reinforcing ribs is no more than one-third of the thickness of the light source supports.

5. The liquid crystal module according to claim 1, wherein each of the reinforcing ribs has a sloped side portion with larger width towards the band-shaped base.

6. The liquid crystal module according to claim 5, wherein the sloped side portion is formed from locations higher than a center of the open ring portion located on both sides of an outer peripheral face of each of the light source supports to the band-shaped base.

7. The liquid crystal module according to claim 5, wherein the thickness of the reinforcing ribs is no more than one-third of the thickness of the light source supports.

8. The liquid crystal module according to claim 1, wherein each of the reinforcing ribs has a vertical side portion having an upright shape.

9. The liquid crystal module according to claim 8, wherein the vertical side portion is formed from locations having substantially same height as a center of the open ring portion located on both sides of an outer peripheral face of each of the light source supports to the band-shaped base.

10. The liquid crystal module according to claim 8, wherein the thickness of the reinforcing ribs is no more than one-third of the thickness of the light source supports.

11. The liquid crystal module according to claim 1, wherein each of the reinforcing ribs has a circular-arced side portion having a substantially semicircular shape.

12. The liquid crystal module according to claim 11, wherein the circular-arced side portion is formed at locations lower than a center of the open ring portion located on both sides of an outer peripheral face of each of the light source supports.

13. The liquid crystal module according to claim 11, wherein the thickness of the reinforcing ribs is no more than one-third of the thickness of the light source supports.

14. The liquid crystal module according to claim 1, wherein each of the light source supports further has a leg portion extending from the open ring portion to the band-shaped base with a transition formed between each of the leg portion and the open ring portion, and
each of the reinforcing ribs is formed at a location including the transition.

* * * * *